Feb. 18, 1969  R. K. STEELE ETAL  3,427,876
PRESSURE SENSING CELL AND SYSTEM
Filed July 25, 1966
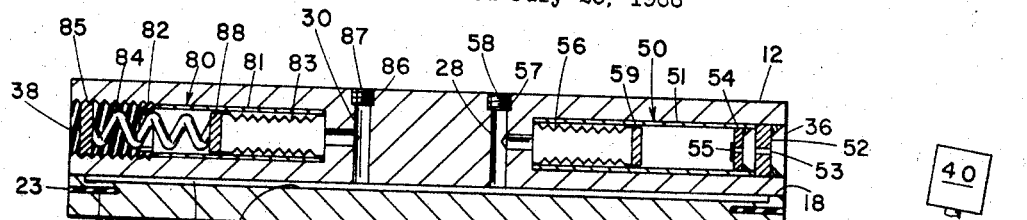
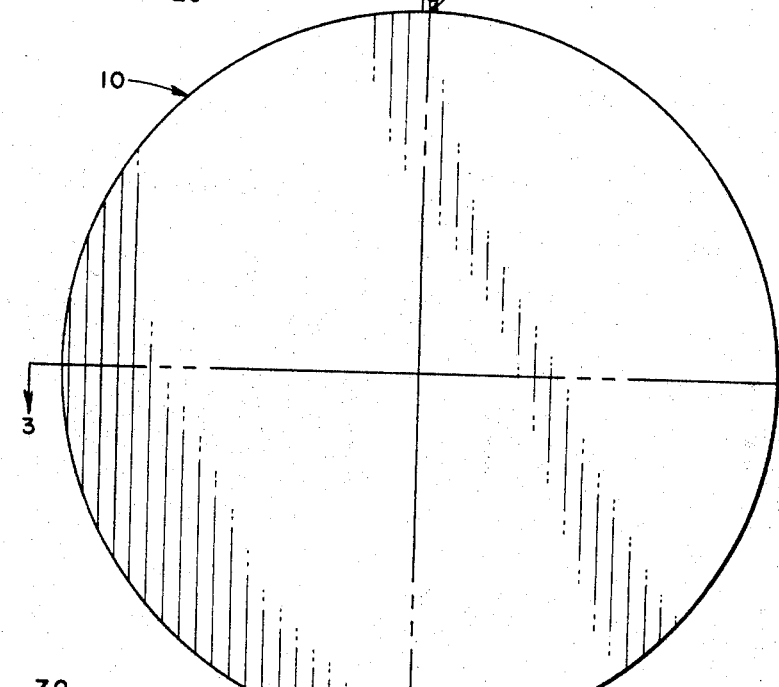
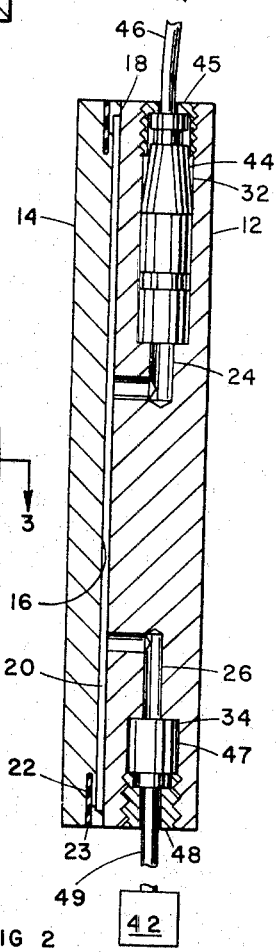
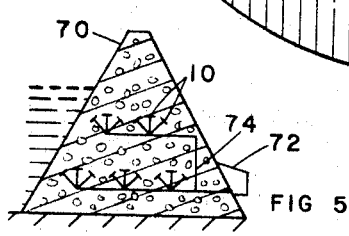
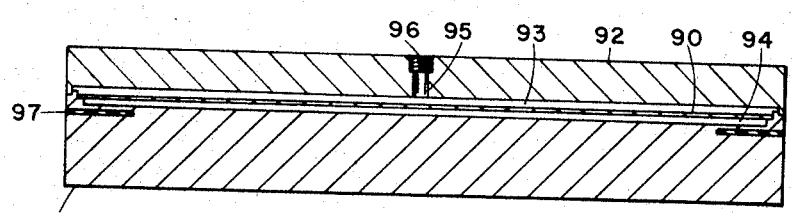
INVENTORS
RICHARD K STEELE
THAMO C CRUISE
SAMUEL W JANG
BY
Edward O Ansell
Albert J Miller
ATTORNEYS

United States Patent Office 3,427,876
Patented Feb. 18, 1969

3,427,876
PRESSURE SENSING CELL AND SYSTEM
Richard K. Steele, Carmichael, Thamo C. Cruise, Rancho Cordova, and Samuel W. Jang, Sacramento, Calif., assignors to Aerojet-General Corporation, El Monte, Calif., a corporation of Ohio
Filed July 25, 1966, Ser. No. 567,455
U.S. Cl. 73—141      10 Claims
Int. Cl. G01d 5/42

---

ABSTRACT OF THE DISCLOSURE

This disclosure concerns a pressure sensing cell for measuring the static and dynamic pressures within a structural body, such as an earth-fill dam, in which the pressure sensing cell is embedded. The pressure sensing cell comprises a support member and a pressure plate member capable of deflection under load which are joined together such that a reservoir is defined between them. The reservoir is filled with a pressure transmitting fluid. A transducer means mounted in the support member is in fluid communication with the reservoir for sensing pressure applied to the pressure plate member. An adjustment means is operably associated with the support member and the pressure plate member for adjusting the rate of deflection of the pressure plate member under load to a value substantially matching that of the intended environment of the sensing cell.

---

This invention relates to stress measurement systems generally, and more particularly to a pressure sensing cell for measuring the static and dynamic pressures of its surroundings.

There are many requirements for sensing instruments or devices to measure the pressures of a specific environment. One of the most notable of these is accurate sensing instruments and recording systems for measuring the magnitude and direction of static and dynamic stresses in earth-fill dams, levees, and foundations. This application has considerable importance in that changes in pressure or stress can then be monitored and corrective action taken to prevent possible catastrophic results which can occur from a failure of such fill structures.

Present sensing devices, which primarily rely upon electrical resistance strain gages, do not fulfill the rigid requirements for operation in an environment such as an earth-fill dam, particularly where large rock sizes are utilized. Existing devices do not offer a maintenance-free life span, or sufficient reliability, and are generally totally dependent upon the physical characteristics of varying lengths of transmission wires for the accuracy of their measurements. None offer the requisite sensitivity or permit a pre-installation adjustment to match the modulus of the device with that of its environment or permit continued calibration after installation.

It is therefore an object of this invention to provide an improved means for the measurement of pressures and stresses in fill materials.

Another object of this invention is to provide an improved pressure sensing cell for the measurement of both static and dynamic stresses in fill materials.

Still another object of this invention is to provide an improved pressure sensing cell having an adjustment to permit the pre-installation matching of the modulus of the cell with the modulus of its intended environment.

Yet another object of this invention is to provide an improved pressure sensing cell having redundant sensors which permit the continued calibration of the sensors after installation.

In one aspect, the pressure sensing cell of the present invention comprises a pressure plate and support member hermetically joined together to form a reservoir for a pressure transmitting fluid. At least one transducer is provided in the support member to sense both static and dynamic loads applied to the pressure plate. The loads applied to the pressure plate cause it to deflect and this pressure is transmitted to the transducers through the fluid. Means are provided to adjust the pressure of the pressure transmitting fluid in the reservoir so as to change the rate of deflection of the pressure plate. A groove, filled with flexible material, may be provided around the periphery of the pressure plate to give the plate a flexible edge area.

By placing the pressure sensing cell in such earth-fill structures as dams, foundations, and levees, accurate indications of the pressure or stresses in such structures can be obtained. Cables connect the sensing cells to remote readout equipment which displays and records the information sensed. The sensing cells are adjusted to match the modulus of their environment and provide accurate measurements by distributing pressure loads over the surfaces of the cells.

These and other objects, advantages, and features of this invention will become apparent to those skilled in the art from the following description, when taken together with the appended drawings, wherein:

FIGURE 1 is a plan view of an embodiment of the pressure sensing cell of the present invention.

FIGURE 2 is a cross-sectional view of the present invention taken along line 2—2 of FIGURE 1.

FIGURE 3 is a cross-sectional view of the present invention taken along line 3—3 of FIGURE 1.

FIGURE 4 is a sectional view of another embodiment of the pressure sensing cell of the present invention.

FIGURE 5 is a sectional view of a pressure measuring system utilizing the present invention for monitoring the pressures in an earth-fill dam.

Referring now to FIGURES 1, 2, and 3, there is shown an embodiment of the pressure sensing cell 10 of the present invention. The cell 10 comprises a flat cylindrical support member or plate 12 and a flat cylindrical pressure plate 14. A recess 16 is machined or otherwise produced in the central portion of one side surface of the pressure plate 14 leaving a flange 18 around the periphery of this surface. The pressure plate flange 18 is hermetically joined, e.g by welding, to the support plate 12 to form a unitary structure which has a central void or reservoir 20.

The pressure plate 14 and support plate 12 can be fabricated of any structural material such as stainless steel or certain high strength plastics. Where steels are used and the plates 12 and 14 are welded together, the combined unitary structure would be heat treated to relieve any stresses resultant from the welding.

A small V-shaped or U-shaped groove 22 extends around the outer circumference of the pressure plate 14. A flexible material 23 such as rubber may be used to fill this groove 22. A flexible circumferential edge surface is thus provided to the pressure plate 14.

An incompressible, nonreactive pressure transmitting fluid, e.g. hydraulic brake fluid, fills the reservoir 20 formed between the pressure plate 14 and support plate 12. Two cylindrical instrument ports 32 and 34 extend radially inward from the circumference of the support plate 12. Connecting channels 24 and 26 extend between the fluid filled reservoir 20 and the ports 32 and 34 respectively. The outer portions of the instrument ports 32 and 34 are threaded to facilitate the installation of instruments.

A vibrating wire transducer 44, such as a Maihak pressure transmitter, type SG5, is positioned within the instrument port 32. A threaded plug 45 holds the transducer 44 in place within the port 32. An electrical lead wire 46 extends from the transducer 44 through the threaded plug 45 to the exterior of the support plate 12. This electrical wire 46, e.g., a two conductor shielded cable, extends to a remote receiver 40 such as the Maihak MDS 3 receiver.

A strain gage type transducer 47, e.g. a Consolidated Electrodynamics Pressure Transducer type 4–311 or equivalent, is held within the instrument port 34 by a threaded plug 48. An electrical lead wire 49 of the transducer 47 extends through the threaded plug 48 to a direct reading oscillograph 42, such as a Honeywell Model 1108 Visicorder Oscillograph. The wire 49 can be a four-conductor shielded cable.

Two other cylindrical ports 36 and 38 extend radially inward from the circumference of the support plate 12 and are linked to the reservoir 20 by connecting channels 28 and 30 respectively. A fluid displacement or pressurization unit 50 is shown in port 36. An alternate fluid displacement or pressurization unit 80 is shown in port 38.

The unit 50 includes a long, cylindrical housing 51 which is held in place in the port 36 by means of a retainer 52 which is welded or otherwise permanently affixed in the port 36. The retainer 52 may have a central opening 53. Welded within the housing 51 near the retainer 52 is a plug 54 which has a centrally located flap valve 55 which can be spring loaded if necessary. A bellows 56 having a piston 59 closing one end is also contained within the housing 51 with its open end communicating with the connecting channel 28 and thus permitting the entrance of the pressure transmitting fluid into the interior of the bellows. A bleed port 57 with a threaded plug 58 is provided in the connecting channel 28. The amount of fluid in the reservoir 20 and its pressure can be regulated by the unit 50. Pressure can be exerted upon the piston 59 at the closed end of the bellows 56 by introducing a gas such as nitrogen under pressure into the housing 51 and maintaining such pressure with the flap valve 55.

The alternate unit 80 also includes a housing 81 held in the port 38 by means of a threaded housing retainer 82, the outer portion of the port 38 likewise being threaded. Pressure on the piston 88 at the closed end of the bellows 83 is maintained by a spring 84 whose force is adjusted by means of a spring retainer 85 also threaded into the port 38. A bleed port 86 with a threaded plug 87 is also provided in connecting channel 30. Either unit 50 or 80 can be utilized in the cell 10.

Referring to FIGURE 4, there is shown an alternate embodiment of the pressure sensing cell. A diaphragm 90 is held between the support plate 91 and pressure plate 92 and thus divides the space therebetween into two chambers 93 and 94. Chamber 93, on the pressure plate side of the diaphragm 90, holds a pressurized gas such as nitrogen. A channel 95 extends between the chamber 93 and the exterior of the pressure plate 92 and is closed by a threaded plug 96.

The chamber 94, formed between the diaphragm 90 and the support plate 91, is filled with a pressure transmitting fluid. A plurality of transducers are connected to the chamber 94 substantially in the manner illustrated in FIGURE 2. A groove 97 can be machined in the support plate 91 to provide a flexible edge area.

Referring now to FIGURE 5, there is shown the pressure sensing cell of the present invention in a system for monitoring the pressures and stresses in an earth-fill dam. During the construction of the dam 70, a plurality of the pressure sensing cells 10 are positioned at various locations and in various places in the dam 70. The cells 10 are connected to their associated readout equipment 72 on the downstream side of the dam by means of heavy duty shielded cables 74. The quantity and size of the cells 10 would be primarily dependent upon the size of the dam and the rock size of the fill.

For a dam having rock sizes from 3-inch minimum to 6-inch maximum diameter, a 30-inch diameter stress cell 10 will operate satisfactorily. For a cell of such diameter, the support plate 12 would be approximately 3½ inches thick and the pressure plate 14 about 1½ inches thick. In this manner, point loading by several or numerous rocks would not cause an incorrect indication of the average pressure existing in the fill. The pressure plate 14 will distribute the point loads evenly over the area of the transmitting fluid, thereby averaging the individual forces exerted on the external face of the pressure plate 14.

In operation, the pressure plate 14 will deflect according to the external forces acting upon it. This deflection of the pressure plate 14 will be transmitted through the transmitting fluid and act upon the transducers 44 and 47. The volume and pressure of the transmitting fluid can be controlled by the fluid displacement adjusting unit 80 to match the modulus of elasticity of the sensing cell 10 to that of the fill material in which it is to be situated. By moving the spring retainer 85, the spring 84 can be expanded or contracted, thus either increasing or decreasing the pressure of fluid in the bellows 83 and reservoir 20. The bleed port 86 permits the addition or removal of fluid. Ohterwise, if the cell 10 were too stiff, it would support more than its proportionate share of the load, thus indicating a higher than existing pressure. On the other hand, if the modulus of the cell 10 is too low, the fill would tend to arch over the soft spot, thereby causing a reading lower than average. Similarly, the change in gas pressure in unit 50 can accomplish the same purpose.

The commercially available vibrating wire transducer 44 will respond to a change in pressure on the pressure transmitting fluid by a change in length in the vibrating wire. The natural frequency of the wire, which is oscillated by an electro-magnet energized from an external source, is thus changed. This frequency is transmitted to the receiver 40 which displays the frequency reading as static pressure. Such readings are independent of the length of connecting cable. Within the receiver 40 is a cathode ray tube upon which the transducer output is compared with the frequency modulated output from a reference wire which is also housed in the receiver. By means of a tuning knob, the two signals, one from the transducer and one from the reference wire, are matched and a scale reading is converted into stress from a calibration curve furnished with the specific signal received.

The strain gage type transducer 47 produces a milliamp current output which is carried to the oscillograph 42. The oscillograph 42 utilizes an ultra-violet light beam reflected from a galvanometer mirror positioned by the current from the transducer 47 to write directly on sensitized paper. The resultant trace, which is immediately readable, indicates the transducer output and can be converted to stress from calibration curves for the specific transducer-oscillograph combination. Both dynamic and static stress readings are recorded in this manner.

By means of a latching relay, the recorder can be automatically activated by a disturbance, and a number of strain gage transducer outputs from a plurality of cells simultaneously recorded.

The sensing cell of the present invention can provide highly accurate measurements up to pressures of 1200 p.s.i. Its rugged construction makes it capable of maintenance-free performance for periods exceeding 10 years. Calibration of the strain gage transducer can be maintained by comparison with the output from the vibrating wire transducer whose output remains stable. There are no external appendages from the cell, the only protrudance being the electrical cables which connect to the readout receivers. The rate of deflection for the pressure plate of the cell can be made to match that of its surroundings, and the pressure sensing area will be nearly equal to the total exposed surface of the pressure plate. Loads in the peripheral area will be transferred, in bending, toward the center area of the pressure plate due to the flexible edge of the plate. In this manner, the loads will be transferred to the fluid rather than the wall of the device.

While a number of details of construction have been illustrated and described, alternatives and equivalents will occur to those skilled in the art which are within the scope and spirit of this invention. It is therefore desired that the protection be not limited to the details herein illustrated and described, but only by the proper scope of the appended claims.

What we claim is:

1. A pressure sensing cell comprising:
   (a) a support member,
   (b) a pressure plate member having a centrol recessed portion with a peripheral flange on one side surface thereof and a groove around the outer periphery thereof, the flange of said pressure plate member attached to the periphery of said support member to form an enclosed reservoir therewith, the central recessed portion of said pressure plate member capable of being deflected under pressure,
   (c) a pressure transmitting fluid contained in the reservoir formed by said support member and said pressure plate member,
   (d) a vibrating wire transducer mounted in said support member and exposed to the pressure transmitting fluid in the reservoir for sensing static pressure applied to said pressure plate member,
   (e) a strain-gage transducer mounted in said support member and exposed to the pressure transmitting fluid in the reservoir for sensing static and dynamic pressures applied to said pressure plate member,
   (f) means associated with said pressure transmitting fluid for adjusting the pressure of the pressure transmitting fluid in the reservoir to change the rate of deflection of said pressure plate member to a value selected to match that of the intended environment of the sensing cell, and
   (g) a length of flexible material filling the groove around the periphery of said pressure plate member, said length of flexible material in the groove thereby providing a flexible edge area to said pressure plate member.

2. The pressure sensing cell of claim 1, and in addition:
   (a) a first receiver means operably associated with said vibrating wire transducer to display signals proportional to the static pressure sensed by said vibrating wire transducer, and
   (b) a second receiver means operably associated with said strain-gage transducer to display signals proportional to the static and dynamic pressures sensed by said strain-gage transducer.

3. A pressure sensing cell comprising:
   (a) a cylindrical plate support member,
   (b) a cylindrical pressure plate member having a central recessed portion with a peripheral flange on one side surface thereof, and a U-shaped groove around the outer periphery thereof, the flange of said pressure plate member fixedly attached to the periphery of said support member to form an enclosed reservoir therewith, the central recessed portion of said pressure plate member capable of being deflected under load,
   (c) a pressure transmitting fluid contained in the reservoir formed by said support member and said pressure plate member,
   (d) a vibrating wire transducer mounted in said support member and exposed to the pressure transmitting fluid in the reservoir for sensing static pressure applied to said pressure plate member,
   (e) a strain-gage transducer mounted in said support member and exposed to the pressure transmitting fluid in the reservoir for sensing static and dynamic pressures applied to said pressure plate member,
   (f) means associated with said pressure transmitting fluid for adjusting the pressure of the pressure transmitting fluid in the reservoir to change the rate of deflection of said pressure plate member to a value selected to match that of the environment of the sensing cell,
   (g) a length of flexible material filling the groove around the periphery of said pressure plate member, said length of flexible material in the groove thereby providing a flexible edge area to said pressure plate member,
   (h) a cathode ray received operably associated with said vibrating wire transducer to display signals proportional to the static pressure sensed by said vibrating wire transducer, and
   (i) a direct reading oscillograph operably associated with said strain-gage transducer to display signals proportional to the static and dynamic pressures sensed by said strain-gage transducer.

4. A pressure sensing cell comprising:
   (a) a support member,
   (b) a pressure plate member disposed in super-imposed relation to said support member and secured thereto along the peripheral margins thereof,
   (c) means defining an enclosed reservoir between said support member and said pressure plate member disposed inwardly of the peripheral margins of said support member and said pressure plate member,
   (d) a pressure transmitting fluid contained in the reservoir formed between said support member and said pressure plate member,
   (e) said pressure plate member being deflectable in response to the application of pressure against the outer surface thereof for transmitting such pressure to the pressure transmitting fluid contained in the reservoir,
   (f) at least one transducer means mounted in said support member and exposed to the pressure transmitting fluid in the reservoir for sensing pressure applied to said pressure plate member and transmitted through said pressure transmitting fluid, and
   (g) adjustable means operably associated with said pressure plate member and said support member for regulating the rate at which said pressure plate member deflects under pressure to conform the rate of deflection of said pressure plate member to a selected value matching that of the intended environment of the sensing cell.

5. The pressure sensing cell of claim 4, and in addition:
   (a) a diaphragm dividing the reservoir formed between the support member and said pressure plate member into two chambers, and
   (b) said pressure transmitting fluid being restricted to the chamber formed between said diaphragm and said support member.

6. A pressure sensing cell as set forth in claim 4, wherein
   (a) said pressure plate member has a peripheral flange thereon extending rearwardly from the surface of said pressure plate member opposed to said support member and secured to the peripheral margin of said support member,
   (b) said peripheral flange on said pressure plate member cooperating therewith in forming a central recessed portion of said pressure plate member which cooperates with said support member to comprise said means defining the enclosed reservoir between said support member and said pressure plate member, and
   (c) the central recessed portion of said pressure plate member being deflectable under pressure.

7. A pressure sensing cell as set forth in claim 4, wherein
   (a) said support member is provided with an elongated port therein in fluid communication with the reservoir;

(b) said adjustable means comprising a bellows disposed within the elongated port and having an open end in fluid communication with the reservoir so as to enable pressure transmitting fluid from the reservoir to be received within the bellows, (c) a piston closing the opposite end of said bellows and slidably received within the elongated port, and (d) means for applying an adjustable biasing force on said piston in a direction tending to reduce the volume within the interior of the bellows to control the volume within the interior of the bellows for regulating the pressurization of the pressure transmitting fluid contained in the reservoir to thereby adjustably control the rate of deflection of said pressure plate member.

8. A pressure sensing cell as set forth in claim 4, wherein (a) said support member is provided with an elongated port therein in fluid communication with the reservoir;

(b) said adjustable means comprising a bellows disposed within the elongated port and having an open end in fluid communication with the reservoir so as to enable pressure transmitting fluid from the reservoir to be received within the bellows, (c) a piston closing the opposite end of said bellows and slidably received within the elongated port, and (d) means for introducing pressure fluid into the elongated port on the side of the bellows opposite from the open end thereof so as to apply pressure on said piston to control the volume within the interior of the bellows for regulating the pressurization of the pressure transmitting fluid contained in the reservoir to thereby adjustably control the rate of deflection of said pressure plate member.

9. A pressure sensing cell as set forth in claim 4, wherein (a) said support member is provided with an elongated port therein in fluid communication with the reservoir;

(b) said adjustable means comprising a bellows disposed within the elongated port and having an open end in fluid communication with the reservoir so as to enable pressure transmitting fluid from the reservoir to be received within the bellows, (c) a piston closing the opposite end of said bellows and slidably received within the elongated port, (d) a spring within the elongated port, said spring having one end bearing against said piston on the side thereof remote from said bellows and biasing said piston in a direction tending to reduce the volume within the interior of the bellows, and (e) a retainer plug against which the other end of said spring is seated, said retainer plug being threadably received by the elongated port and being adjustably movable within the elongated port to vary the biasing force of said spring applied to said piston, thereby controlling the volume within the interior of the bellows for regulating the pressurization of the pressure transmitting fluid contained in the reservoir so as to adjustably control the rate of deflection of said pressure plate member.

10. A pressure sensing cell comprising:

(a) a support member, (b) a pressure plate member disposed in super-imposed relation to said support member and secured thereto along the peripheral margins thereof, (c) means defining an enclosed reservoir between said support member and said pressure plate member disposed inwardly of the peripheral margins of said support member and said pressure plate member, (d) a flexible diaphragm dividing the reservoir into two chambers, the first chamber being formed by said diaphragm and the inner surface of said pressure plate member, and the second chamber being formed by said diaphragm and the opposed inner surface of said support member, (e) a pressurized gas contained in said first chamber, (f) a pressure transmitting fluid contained in said second chamber, (g) said pressure plate member being deflectable in response to the application of pressure against the outer surface thereof, (h) means for varying the pressure of said pressurized gas in said first chamber to adjust the rate of deflection of said pressure plate member to a value selected to match that of the intended environment of the sensing cell, and (i) at least one transducer means mounted in said support member and exposed to the pressure transmitting fluid in said second chamber for sensing pressure applied to said pressure plate member.

References Cited

UNITED STATES PATENTS

| 2,148,013 | 2/1939 | Carlson | 73—88.5 |
|---|---|---|---|
| 2,336,500 | 12/1943 | Osterberg | 73—84 |
| 3,177,726 | 4/1965 | Fisher | 73—498 X |
| 3,178,937 | 4/1965 | Bradley | 73—497 |
| 3,355,936 | 12/1967 | Glötel | 73—88.5 |

FOREIGN PATENTS 630,601  11/1961  Canada.

RICHARD C. QUEISSER, *Primary Examiner.*

JERRY W. MYRACLE, *Assistant Examiner.*

U.S. Cl. X.R.

73—84, 398